United States Patent Office 3,345,420
Patented Oct. 3, 1967

---

3,345,420
1,1,3,3-TETRAHALO-2,2,4,4-TETRAMETHYL-CYCLOBUTANES
Heinrich G. Gilch, Plainfield, N.J., assignor to Union Carbide Corporation, a corporation of New York
No Drawing. Filed Dec. 13, 1963, Ser. No. 330,257
2 Claims. (Cl. 260—648)

This invention relates to the preparation of 1,1-dihaloolefins from novel 1,1,3,3-tetrahalo-2,2,4,4-tetralkylcyclobutanes.

Several methods have been described in the literature for the preparation of 1,1-dihaloolefins but are generally unsatisfactory because of low yields, numerous reaction steps, undesirable by-product formation and other reasons. For example, 1,1-dichloroisobutylene can be synthesized from acetone and chloroform as shown below, but in poor yields.

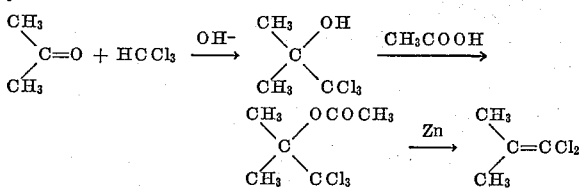

The preparation of 1,1-difluoro-2,2-dimethylethylene from 1,1-dimethyl-2,2,3,3-tetrafluorocyclobutane is accompanied by a plurality of by-products.

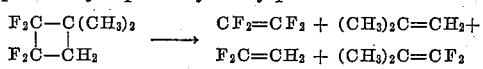

In view of the known usefulness of 1,1-dihaloolefins as comonomers for the preparation of injection moldable copolymers, it is an object of this invention to provide a facile method for their preparation in good yields with a minimum production of by-products or impurities.

It has now been found that 1,1-dihaloolefins can be readily prepared by exposing a tetrahalotetralkylcyclobutane having the formula

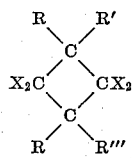

wherein X is a halogen atom and each of R, R', R" and R''' is a monovalent alkyl radical, to a pyrolyzing temperature in the range of about 600–1000° C. The halogen atoms of this invention include F, Cl, Br and I atoms. The preferred monovalent alkyl radicals contain up to 6 carbon atoms as for example, methyl, ethyl, n-propyl, isopropyl, n-butyl, iso-butyl, sec.-butyl, t-butyl, n-pentyl, 1-methylbutyl, 2-methylbutyl, isopentyl, neopentyl, t-pentyl, n-hexyl, 1-methylpentyl, 2-methylpentyl, 3-methylpentyl groups and the like. Higher alkyl groups can also be used if desired.

In a preferred method of operation, the tetrahalotetralkylcyclobutane is passed through a reaction zone maintained at a temperature of 700–900° C.

This pyrolysis reaction can be carried out conveniently in a reactor fabricated from any chemically inert, infusible material of construction such as quartz, heat resistant glass, stainless steel and the like. A straight tubular reactor can be conveniently employed but other geometrical designs can also be employed. If desired, the reactor may be packed with a chemically inert, heat-resistant packing as for example, quartz, nickel or stainless steel.

The pressure in the reactor during pyrolysis is not narrowly critical with superatmospheric, and subatmospheric pressures being effective as well as atmospheric pressures. Since it is preferred to carry out the pyrolysis operations in the vapor phase, subatmospheric pressures are preferred with higher boiling tetrahalotetralkylcyclobutanes, i.e., pressures of less than 100 mm. of mercury. A vapor phase technique permits a speedy removal of reaction products from the reactor thus diminishing the possibilities of further reaction to undesirable by-products as well as other thermal degradative processes. However, liquid phase reactions can also be employed.

While the residence time is not critical, high space velocities are preferred in order to minimize side reactions and provide a more economical process.

The invention is preferably practiced as a continuous process although a batch process technique can be used if desired, as for example, with reactants that are difficult to vaporize.

The heating of the reactor can be effected by means of an electric furnace, insulated heating tapes or other devices well known in the art.

The pyrolysis products can be trapped and protected from further undesirable reactions by leading them into traps cooled with solid carbon dioxide or liquid nitrogen.

The tetrahalotetralkylcyclobutanes of this invention may be synthesized from the corresponding tetralkylcyclobutanediones by causing them to react with inorganic halogen containing compounds, such as phosphorus pentachloride, phosphorus pentafluoride, sulfur tetrafluoride and the like. Thus, for example, 1,1,3,3-tetrachloro-2,2,4,4-tetramethylcyclobutane can be prepared from 1,1,3,3-tetramethylcyclobutanedione and phosphorus pentachloride as depicted below:

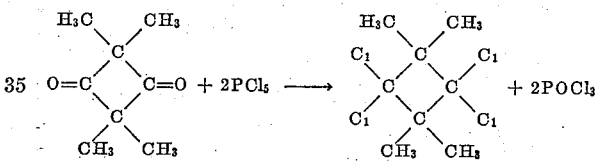

In a similar manner 1,1,3,3-tetrafluoro-2,2,4,4-tetramethylcyclobutane can be prepared from 1,1,3,3-tetramethylcyclobutadione and sulfur tetrafluoride as depicted below:

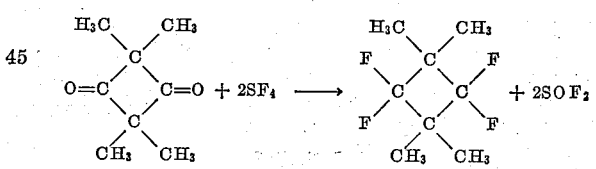

Both the tetrachloro- and tetrafluoro-2,2,4,4-tetramethylcyclobutanes are new compounds and are a part of this invention.

The pyrolysis reaction is exemplified with the conversion of 1,1,3,3-tetrafluoro-2,2,4,4-tetramethylcyclobutane to 1,1-difluoro-2,2-dimethylethylene as represented below:

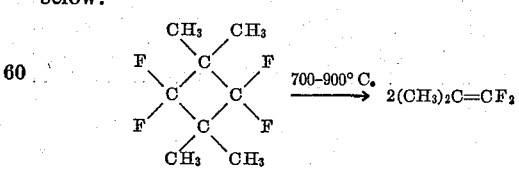

An inert atmosphere can be maintained in the reaction zone if desired, by flushing with nitrogen, argon, helium and the like. However, the pyrolysis can be conducted without taking special precautions to exclude atmospheric oxygen from the reactor, when subatmospheric pressures are employed with vapor phase reactions since the reactant vapors themselves will sweep out the little atmospheric oxygen initially present in the reactor.

EXAMPLE 1

*Preparation of 1,1,3,3-tetrachloro-2,2,4,4-tetramethylcyclobutane*

A two-liter, round-bottom, three neck flask fitted with a mechanical stirrer, reflux condenser and thermometer was charged with 200 g. of 1,1,3,3-tetramethylcyclobutadione, 1225 g. of phosphorus pentachloride and 300 ml. of carbon tetrachloride. This mixture was refluxed for two hours followed by removal of the carbon tetrachloride and phosphorus oxychloride which formed by distillation. The residue in the flask was poured into a two liter beaker containing 500 g. of wet ice. The solid product which formed was purified by recrystallization from a 1:1 (volume:volume) mixture of tetrahydrofuran and methanol. In this manner 317 g. of crystalline 1,1,3,3-tetrachloro-2,2,4,4-tetramethylcyclobutane having a melting point of 234–6° C. (uncorrected) was isolated. The nuclear magnetic resonance and infrared spectra were used to identify the product. Additional support was obtained from microanalytical data: Calculated—C, 38.4%; H, 4.8%; Cl, 56.8%. Observed—C, 38.5%; H, 5.4%; Cl, 56.6%.

EXAMPLE 2

*Preparation of 1,1-dichloro-2,2-dimethylethylene*

The pyrolysis reactor was comprised of a heat resistant glass sold commercially as Vycor, 30 cm. long and 3.5 cm. in diameter encased in an electric furnace. A thermocouple located in the reactor controlled the reaction temperature at about 700° C. by means of a pyrometer controller equipped with an electromagnetic relay. The reactor was mounted vertically with a heated 500 cc. three neck, round-bottom flask connected to the bottom of the tube. A 500 cc. two neck, round-bottom flask connected to the top of the reactor was cooled in a Dry Ice-acetone slurry. The system was maintained at a pressure of 0.5 to 0.1 mm. of mercury by means of a vacuum pump.

Into the bottom of this reactor was introduced 40 g. of 1,1,3,3-tetrachloro-2,2,4,4-tetramethylcyclobutane over a period of 2 hours. This charge passed through the reactor into the 500 cc. two neck flask where 13.7 g. of 1,1-dichloro-2,2-dimethylethylene, boiling at 108° C./atm. and 24 g. of unreacted starting material were recovered. The dihaloolefin product was readily separated by fractional distillation and represented a conversion of 39% at an efficiency of 87%.

EXAMPLE 3

*Preparation of 1,1,3,3-tetrafluoro-2,2,4,4-tetramethylcyclobutane*

A high pressure rocking autoclave having a void of 1,800 ml. was charged with 160 g. of 1,1,3,3-tetramethylcyclobutadione and 2 ml. of water. The autoclave was purged free of air with nitrogen and then cooled to −78° C. under an atmosphere of nitrogen. Gaseous sulfur tetrafluoride (450 g.) was passed into the sealed autoclave where it condensed to a liquid. The temperature in the autoclave was gradually raised to 190° C. and kept at this temperature for 66 hours. The autoclave was then cooled to −78° C. and a mixture of sulfur tetrachloride and sulfur oxydifluoride removed by distillation from the autoclave. About 150 g. of 1,1,3,3-tetrafluoro-2,2,4,4-tetramethylcyclobutane, melting point, 64.5 to 65° C., was obtained from the residue by fractional distillation at 110°–111° C./atm. The identity of the product was established from its infrared and nuclear magnetic resonance spectra. Additional supporting evidence was afforded by chemical analysis for fluorine; calculated: 41.30%; found: 41.30%.

EXAMPLE 4

*Preparation of 1,1-difluoro-2,2-dimethylethylene*

Freshly prepared 1,1,3,3-tetrafluoro-2,2,4,4-tetramethylcyclobutane (19.4 g.) was passed through a Vycor tube reactor, 60 cm. long and 2.2 cm. in diameter, heated to 690° C. The reactant was introduced continuously into the reactor through a capillary tube having an orifice of about 0.8 mm., over a period of two hours. The pressure in the reactor during this operation was less than 0.1 mm. The pyrolysis vapors were condensed in two traps arranged in series, the first being cooled with a Dry Ice-acetone slurry and the second with liquid nitrogen. About 4.2 g. of 1,1-difluoro-2,2-dimethylethylene were thus obtained representing a conversion of 33%. This product was identified by examination of its infrared and nuclear magnetic resonance spectra. There was also 13.1 g. of the starting material recovered unchanged.

In addition to their utility as intermediates for the preparation of copolymers, the 1,1-dihaloolefins of this invention are also useful as solvents for degreasing metals and for dry cleaning fabrics since they are miscible in all proportions with naphthenic and paraffinic base lubricating oils and greases, silicone oils and greases, paraffinic waxes, as well as natural fats such as butter. The lower boiling 1,1-dihaloolefins as for example, 1,1-difluoro-2,2-dimethylethylene, boiling at 11° C. can be used as a cooling agent for refrigeration and as a blowing agent for producing foamed plastics.

Although the invention has been described in its preferred forms with a certain degree of particularity, it is understood that the present disclosure has been made only by way of example, and that numerous changes may be resorted to without departing from the spirit and the scope of the invention.

What is claimed is:
1. 1,1,3,3-tetrachloro-2,2,4,4-tetramethylcyclobutane.
2. 1,1,3,3-tetrafluoro-2,2,4,4-tetramethylcyclobutane.

References Cited

UNITED STATES PATENTS

| | | | |
|---|---|---|---|
| 2,462,345 | 2/1949 | Barrick | 260—648 |
| 2,733,278 | 1/1956 | Anderson | 260—653 |

OTHER REFERENCES

Adams et al.: "Org. Reactions," vol. 12, pp. 15, 34 and 41 (1962).

LEON ZITVER, *Primary Examiner.*

M. M. JACOB, *Assistant Examiner.*